US010710561B2

(12) United States Patent
Georgin

(10) Patent No.: US 10,710,561 B2
(45) Date of Patent: Jul. 14, 2020

(54) DECELERATION PEDAL CONTROL FOR BRAKING SYSTEMS

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/290,420

(22) Filed: Mar. 1, 2019

(65) Prior Publication Data

US 2019/0193692 A1    Jun. 27, 2019

Related U.S. Application Data

(62) Division of application No. 15/595,499, filed on May 15, 2017, now Pat. No. 10,259,435.

(51) Int. Cl.
*B60T 8/172* (2006.01)
*B64C 25/42* (2006.01)
(Continued)

(52) U.S. Cl.
CPC .............. *B60T 8/172* (2013.01); *B60T 7/042* (2013.01); *B60T 8/171* (2013.01); *B60T 8/1703* (2013.01);
(Continued)

(58) Field of Classification Search
CPC ........ B60T 8/172; B60T 8/1703; B60T 8/171; B60T 8/1761; B60T 8/1701; B60T 8/176; B60T 2201/03; B64C 25/426
See application file for complete search history.

(56) References Cited

U.S. PATENT DOCUMENTS 4,367,529 A   1/1983  Masclet et al.
4,482,961 A   11/1984 Kilner et al.
(Continued)

FOREIGN PATENT DOCUMENTS

FR   3008368    1/2015
GB   2292195    2/1996
(Continued)

OTHER PUBLICATIONS

European Patent Office, European Search Report dated Sep. 7, 2018 in Application No. 18172307.3-1012.
(Continued)

*Primary Examiner* — Vishal R Sahni
(74) *Attorney, Agent, or Firm* — Snell & Wilmer, L.L.P.

(57) ABSTRACT

Systems and methods for aircraft braking are disclosed. The systems and methods may comprise a control mode executive configured to receive a pedal input and calculate a gear deceleration command comprising a desired deceleration rate based on the pedal input; a pedal deceleration controller in electronic communication with the control mode executive configured to receive the gear deceleration command from the control mode executive and calculate a gear pedal command based on at least one of the gear deceleration command and a deceleration feedback; and a pedal executive in electronic communication with the pedal deceleration controller configured to receive the gear pedal command, and generate a pedal braking command based on the gear pedal command.

4 Claims, 4 Drawing Sheets

(51) Int. Cl.
*B60T 8/17* (2006.01)
*B60T 8/171* (2006.01)
*B60T 8/1761* (2006.01)
*B60T 7/04* (2006.01)
*B60T 8/32* (2006.01)
*B60T 8/176* (2006.01)

(52) U.S. Cl.
CPC ............ *B60T 8/1761* (2013.01); *B60T 8/325* (2013.01); *B64C 25/426* (2013.01); *B60T 8/1701* (2013.01); *B60T 8/176* (2013.01); *B60T 2201/03* (2013.01)

(56) References Cited

U.S. PATENT DOCUMENTS

| | | | |
|---|---|---|---|
| 4,610,484 A | 9/1986 | Amberg et al. | |
| 5,136,510 A * | 8/1992 | Beck | B60T 8/00 244/111 |
| 5,217,282 A * | 6/1993 | Guichard | B60T 8/00 188/382 |
| 7,165,820 B2 | 1/2007 | Rudd, III | |
| 8,180,548 B2 * | 5/2012 | Cahill | B60T 8/1703 303/126 |
| 8,403,429 B2 | 3/2013 | Hurst et al. | |
| 9,412,210 B2 | 8/2016 | Raby et al. | |
| 2004/0011596 A1 * | 1/2004 | Miller | B60T 17/22 188/1.11 W |
| 2006/0186267 A1 * | 8/2006 | Steiner | B60T 8/1703 244/110 A |
| 2011/0130935 A1 * | 6/2011 | Krueger | B60T 7/042 701/70 |
| 2013/0110323 A1 * | 5/2013 | Knight | G01S 17/933 701/3 |
| 2013/0245907 A1 * | 9/2013 | McKay | B60T 8/1703 701/71 |
| 2015/0012195 A1 * | 1/2015 | Georgin | B64C 25/42 701/70 |
| 2015/0344129 A1 * | 12/2015 | Georgin | B60T 7/042 701/3 |
| 2016/0031553 A1 * | 2/2016 | Di Zazzo | B64C 25/34 701/3 |
| 2018/0201367 A1 | 7/2018 | Georgin | |

FOREIGN PATENT DOCUMENTS

| | | | |
|---|---|---|---|
| GB | 2554097 | * | 3/2018 |
| WO | 2008097260 | | 8/2008 |

OTHER PUBLICATIONS

USPTO; Restriction Requirement Office Action dated Apr. 18, 2018 in U.S. Appl. No. 15/595,499.
USPTO; Non-Final Office Action dated Jul. 26, 2018 in U.S. Appl. No. 15/595,499.
USPTO; Notice of Allowance dated Dec. 11, 2018 in U.S. Appl. No. 15/595,499.

* cited by examiner

DECELERATION PEDAL CONTROL FOR BRAKING SYSTEMS

CROSS REFERENCE TO RELATED APPLICATIONS

This application is a divisional of, and claims priority to and the benefit of, U.S. Ser. No. 15/595,499 filed May 15, 2017 and entitled "DECELERATION PEDAL CONTROL FOR BRAKING SYSTEMS," which is hereby incorporated herein in its entirety for all purposes.

FIELD

The present disclosure relates to aircraft braking systems, and more specifically, to braking systems comprising deceleration pedal control capabilities.

BACKGROUND

Modern aircraft are typically equipped with a braking system. During a landing phase, taxiing, or a Rejected Take-Off ("RTO") event, for example, a pilot may engage a pedal to decrease the speed of the plane. Based on the deflection of the pedal by the pilot, the braking system may apply a pressure to one or more of the aircraft wheels through one or more brakes, slowing the plane.

SUMMARY

In various embodiments, an aircraft braking system is disclosed. In various embodiments, an aircraft braking system may comprise a control mode executive configured to receive a pedal input and calculate a gear deceleration command comprising a desired deceleration rate based on the pedal input; a pedal deceleration controller in electronic communication with the control mode executive configured to receive the gear deceleration command from the control mode executive and calculate a gear pedal command based on at least one of the gear deceleration command and a deceleration feedback; and a pedal executive in electronic communication with the pedal deceleration controller configured to receive the gear pedal command, and generate a pedal braking command based on the gear pedal command.

In various embodiments, the aircraft braking system may further comprise a pedal braking controller in electronic communication with the pedal executive configured to calculate a final brake command, wherein the final brake command is based on at least one of the pedal braking command and a braking feedback. In various embodiments, the pedal executive may be configured to generate the pedal braking command based on the gear pedal command in response to an aircraft traveling at a high speed above a speed threshold. In various embodiments, the control mode executive may be configured to calculate a braking force command based on the pedal input. The pedal executive may be configured to receive the braking force command from the control mode executive and calculate the pedal braking command based on the braking force command in response to the aircraft traveling at a low speed below a speed threshold. In various embodiments, the pedal braking command may be configured to cause a brake assembly to exert a braking force on a gear.

In various embodiments, the aircraft braking system may further comprise an autobrake controller in electronic communication with the control mode executive configured to receive an aircraft deceleration target from the control mode executive, and calculate an initial autobrake pedal command based on the aircraft deceleration target and an aircraft deceleration feedback. In various embodiments, the aircraft braking system may further comprise an autobrake pedal executive configured to receive the initial autobrake pedal command and calculate an autobrake pedal command based on the initial autobrake pedal command. In various embodiments, the aircraft braking system may further comprise a pedal balance controller configured to calculate an autobrake pedal correction factor based on at least one of an aircraft yaw angle, an aircraft yaw speed, and an aircraft wheel speed. The autobrake pedal executive may be configured to calculate the autobrake pedal command based on at least one of the initial autobrake pedal command or the autobrake pedal correction factor. In various embodiments, the pedal input may be received from at least one of a pedal brake in electronic communication with the control mode executive or an autonomous pedal command in electronic communication with the control mode executive.

In various embodiments, a method of aircraft braking may comprise receiving, by a controller, a pedal input from at least one of a brake pedal or an autonomous pedal command; calculating, by the controller, a gear deceleration command comprising a desired deceleration rate; transmitting, by the controller, the gear deceleration command to a pedal deceleration controller; calculating, by the controller, a gear pedal command based on at least one of the gear deceleration command or a deceleration feedback; and generating, by the controller, a pedal braking command based on the gear pedal command. In various embodiments, the method may further comprise calculating, by the controller, a final brake command, wherein the final brake command is based on at least one of the pedal braking command or a braking feedback. In various embodiments, the method may further comprise commanding, by the controller, a braking assembly to apply a braking force to a gear based on the pedal braking command.

In various embodiments, the pedal input may be associated with a deflection amount of the brake pedal. In various embodiments, the calculating the pedal braking command may be based on the gear pedal command in response to an aircraft traveling at a speed above a speed threshold. In various embodiments, the method may further comprise calculating, by the controller, a braking force command based on the pedal input, and wherein the calculating the pedal braking command may be based on the braking force command in response to an aircraft traveling at a speed below the speed threshold.

In various embodiments, a tangible, non-transitory memory configured to communicate with a processor, the tangible, non-transitory memory having instructions stored thereon that, in response to execution by the processor, cause the processor to perform operations comprising receiving, by the processor, a pedal input from at least one of a brake pedal or an autonomous pedal command; calculating, by the processor, a gear deceleration command comprising a desired deceleration rate; calculating, by the processor, a gear pedal command based on at least one of the gear deceleration command or a deceleration feedback; and generating, by the processor, a pedal braking command based on the gear pedal command. In various embodiments, the operations may further comprise calculating, by the processor, a final brake command, wherein the final brake command may be based on at least one of the pedal braking command or a braking feedback. In various embodiments, the operations may further comprise commanding, by the processor, a braking assembly to apply a braking force to a gear in response to the generating the pedal braking command.

In various embodiments, the pedal input may be associated with a deflection amount of the brake pedal. In various embodiments, the calculating the pedal braking command may be based on the gear pedal command in response to an aircraft traveling at a speed above a speed threshold. In various embodiments, the operations may further comprise calculating, by the processor, a braking force command based on the pedal input, and wherein the calculating the pedal braking command may be based on the braking force command in response to an aircraft traveling at a speed below the speed threshold.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Figure 1:
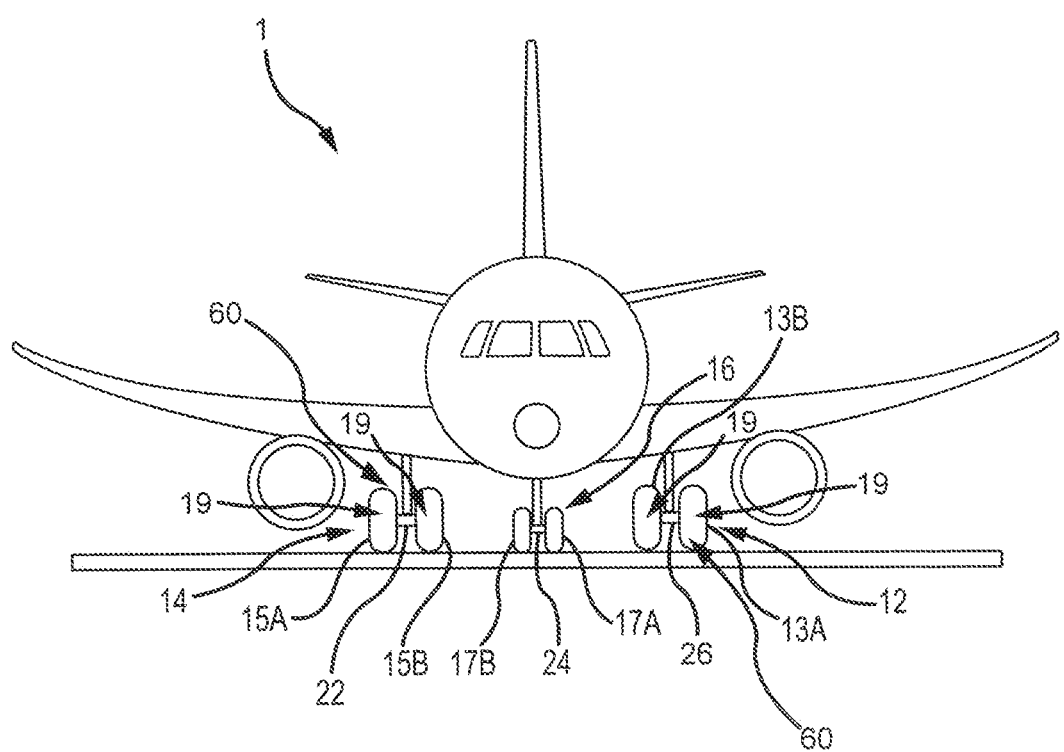
FIG. 1 illustrates an exemplary aircraft, in accordance with various embodiments.

In various embodiments, and with reference to FIG. 1, an exemplary aircraft 1 is depicted. Aircraft 1 may include landing gear such as landing gear 12, landing gear 14, and landing gear 16. Landing gear 12, landing gear 14, and landing gear 16 may generally support aircraft 1 when aircraft 1 is not flying, allowing aircraft 1 to taxi, take off, and land without damage. Landing gear 12 may include wheel 13A and wheel 13B coupled by a strut 26; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. Nose wheels 17A and 17B differ from the main wheels in that the nose wheels may not include a brake. In various embodiments, aircraft 1 may comprise any number of landing gears and each landing gear may comprise any number of wheels.

Aircraft 1 may also include a braking assembly 60, which may be applied to any wheel of any landing gear. Braking assembly 60 may comprise the brakes 19 of each landing gear (e.g., landing gear 12, landing gear 14, and/or landing gear 16), and each brake 19 may be mounted to each wheel, and/or a gear coupled to each wheel, to apply and release braking force on one or more gears and/or wheels (e.g., as described herein).

Aircraft wheel and brake assemblies may typically include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although in various embodiments, brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the gear and/or wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic components that implement brake logic. In various embodiments, the brake controller may comprise other electrical devices to implement brake logic.

Figure 2:
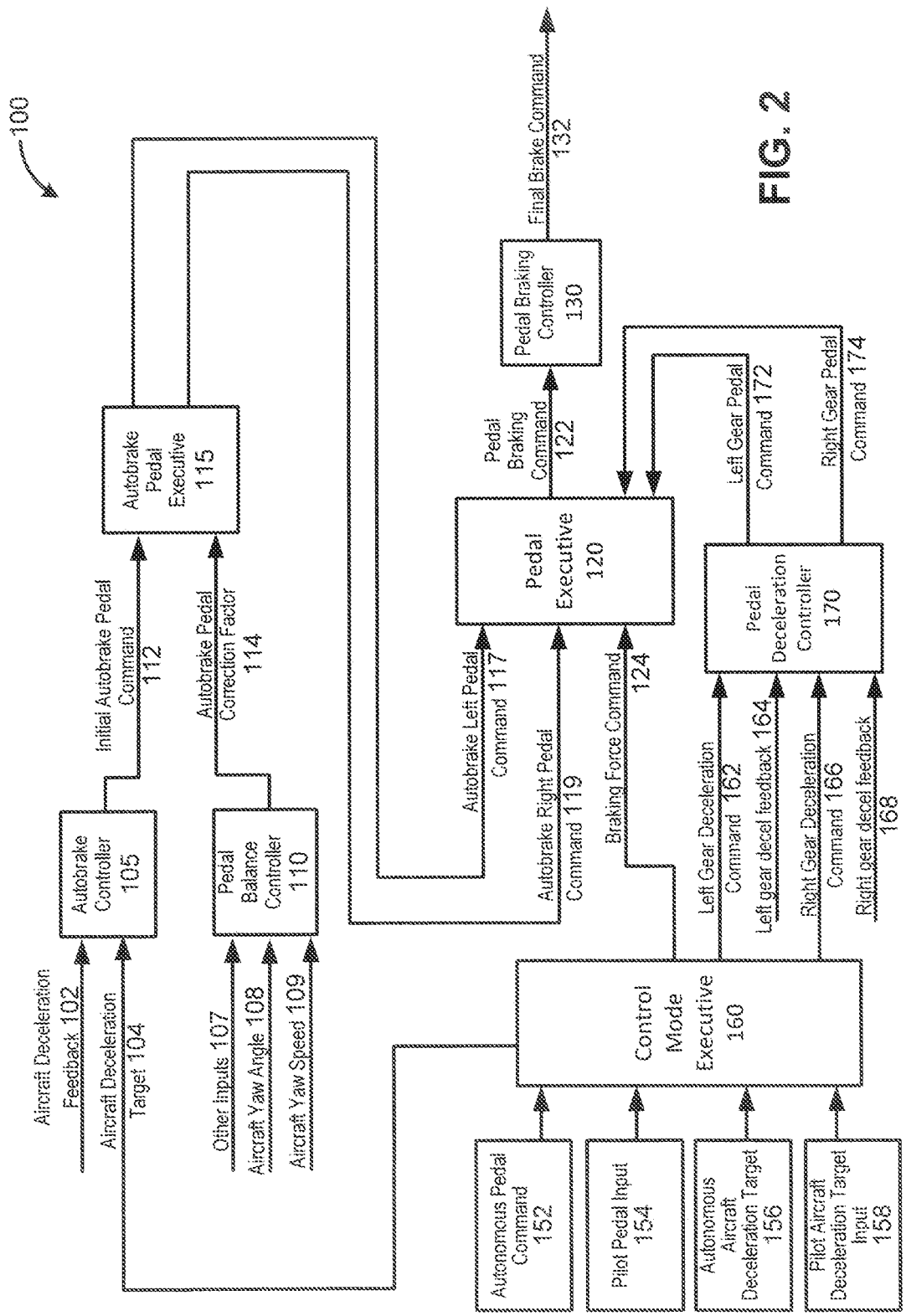
FIG. 2 illustrates a schematic view of an aircraft braking system, in accordance with various embodiments.

In various embodiments, and with reference to FIG. 2, an aircraft braking system 100 is disclosed. Aircraft braking system 100 of aircraft 1 may be one or more controllers comprising a collection of subsystems that produce output signals for controlling the braking force and/or torque applied by braking assembly 60 at each wheel (e.g., wheel 13A, wheel 13B, wheel 15A, wheel 15B, nose wheel 17A, and/or nose wheel 17B). Aircraft braking system 100 may be configured to control the deceleration of an aircraft (e.g., aircraft 1 of FIG. 1) during a deceleration event such as, for example, a landing phase, a RTO event, and/or the like, by transmitting a final brake command 132 to braking assembly 60. In that respect, aircraft braking system 100 may provide brake control capabilities for manual and autonomous braking of manned aircrafts (e.g., pilot commanded) and/or unmanned vehicles such as, for example, an unmanned aerial vehicle, an unmanned aerial system, and/or the like. Aircraft braking system 100 may be configured to decelerate the aircraft while maintaining a steady and/or desired course. For example, external factors such as wind, operating conditions of various components of the aircraft (e.g., imbalanced reverse thrusters, differing characteristics of individual braking systems, etc.), and/or the like may cause the aircraft to stray off a desired course of flight. In such conditions, aircraft braking system 100 may assist in maintaining the desired course of the aircraft during deceleration. The desired course may comprise, for example, a straight line, notwithstanding environmental factors such as wind and/or ground conditions. Furthermore, aircraft braking system 100 may be used to control, for example, two or more aircraft wheels (e.g., wheel 13A, wheel 13B, wheel 15A, wheel 15B, nose wheel 17A, and/or nose wheel 17B of FIG. 1). Aircraft braking system 100 may be configured to control a left side wheel and a right side wheel independently to allow for differential braking. Any number and configuration of wheels controlled by aircraft braking system 100 is within the scope of the present disclosure.

In various embodiments, aircraft braking system 100 may comprise various software and/or hardware components, controllers, and/or the like. For example, aircraft braking system 100 may comprise an autobrake controller 105, a pedal balance controller 110, an autobrake pedal executive 115, a pedal executive 120, a control mode executive 160, a pedal braking controller 130, and/or a pedal deceleration controller 170. In various embodiments, braking assembly 60, which is in communication with aircraft braking system 100, may comprise, for example, an electric, a hydraulic, or a hybrid electric-hydraulic braking assembly, as previously described. Aircraft braking system 100 may be configured to control braking force in an aircraft (e.g., aircraft 1 of FIG. 1) applied by braking assembly 60.

In various embodiments, aircraft braking system 100 may be comprised in an aircraft (e.g., aircraft 1 in FIG. 1) and may be integrated into computer systems onboard the aircraft such as, for example, a brake control unit (BCU), a full authority digital engine control (FADEC), an engine-indicating and crew-alerting system (EICAS), and/or the like. Aircraft braking system 100 may also be a standalone computer system separate from the aircraft and in electronic communication with the aircraft, as described in further detail herein. Aircraft braking system 100 may include one or more processors and/or one or more tangible, non-transitory memories and be capable of implementing logic. As described herein, each subsystem, component, "controller", and/or the like may also comprise an individual processor and/or one or more tangible, non-transitory memories and be capable of implementing logic. In other embodiments, each subsystem, component, controller, and/or the like may also be implemented in a single processor (e.g., aircraft braking system 100 may comprise a single processor). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, aircraft braking system 100, and/or each individual subsystem, component, and/or controller, may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, aircraft braking system 100 may comprise an autobrake controller 105. Autobrake controller 105 may be in electronic communication with autobrake pedal executive 115 and/or control mode executive 160. Autobrake controller 105 may also be in electronic communication with various inputs, sensors, and/or the like, as discussed further herein. Autobrake controller 105 may be configured to calculate and/or transmit an initial autobrake pedal command 112. Autobrake controller 105 may calculate the initial autobrake pedal command 112 in response to receiving an aircraft deceleration target 104. Autobrake controller 105 may receive the aircraft deceleration target 104 from any suitable source, such as, for example, from control mode executive 160, as discussed further herein. The aircraft deceleration target 104 may comprise data indicative of a desired deceleration rate for an aircraft. For example, the aircraft deceleration target 104 may comprise data indicating to decelerate the aircraft at a rate of about 1.0 m/s$^2$ (3.28 ft/s$^2$) to about 2.5 m/s$^2$ (8.2 ft/s$^2$), about 2.5 m/s$^2$ (8.2 ft/s$^2$) to about 3.5 m/s$^2$ (11.48 ft/s$^2$), about 3.5 m/s$^2$ (11.48 ft/s$^2$) to about 5.0 m/s$^2$ (16.4 ft/s$^2$), and/or any other suitable and/or desired deceleration rate (wherein about in this context refers only to +/−1.0 m/s$^2$ (3.28 ft/s$^2$)).

In various embodiments, autobrake controller 105 may also be configured to receive an aircraft deceleration feedback 102. Aircraft deceleration feedback 102 may comprise data indicating the measured deceleration rate of the aircraft. Autobrake controller 105 may receive aircraft deceleration feedback 102 from any suitable source. For example, the deceleration of the aircraft may be calculated and/or measured by a wheel speed sensor, a gyroscope sensor, a global positioning system (GPS), and/or any other suitable input, sensor, and/or the like capable of calculating the deceleration of the aircraft.

Autobrake controller 105 may calculate the initial autobrake pedal command 112 based on the aircraft deceleration target 104 and/or the aircraft deceleration feedback 102. For example, in response to the aircraft deceleration feedback 102 comprising data indicating that the aircraft is decelerating at 1.0 m/s$^2$ (3.28 ft/s$^2$) and the aircraft deceleration target 104 comprising data indicating that the target or desired deceleration rate is 2.5 m/s$^2$ (8.2 ft/s$^2$), autobrake controller 105 may calculate the initial autobrake pedal command 112 to comprise data indicating that an additional 1.5 m/s$^2$ (4.92 ft/s$^2$) of deceleration is needed. Autobrake controller 105 may transmit the initial autobrake pedal command 112 to autobrake pedal executive 115.

In various embodiments, aircraft braking system 100 may comprise a pedal balance controller 110. Pedal balance controller 110 may be in electronic communication with autobrake pedal executive 115. Pedal balance controller 110 may also be in electronic communication with various inputs, sensors, and/or the like, as discussed further herein. Pedal balance controller 110 may be configured to calculate and/or transmit an autobrake pedal correction factor 114. In various embodiments, pedal balance controller 110 may be configured to calculate a single autobrake pedal correction factor 114 or multiple autobrake pedal correction factors 114 (e.g., pedal balance controller 110 may calculate a separate autobrake pedal correction factor for a left pedal and a right pedal, and/or the like). Autobrake pedal correction factor 114 may comprise data indicating various environmental and operating conditions of the aircraft. For example, pedal balance controller 110 may receive data relating to environmental and/or operating conditions, such as an aircraft yaw angle 108, an aircraft yaw speed 109, and/or other inputs 107 (e.g., aircraft wheel speed). Pedal balance controller 110 may receive the data from any suitable input, sensor, and/or the like. The autobrake pedal correction factor 114 may be based on at least one of the aircraft yaw angle 108, the aircraft yaw speed 109, and/or the other inputs 107. In that respect, the autobrake pedal correction factor 114 may be used to modify initial autobrake pedal command 112 to accommodate for measured environmental and/or operating conditions and assist in maintaining a desired course of the aircraft. Pedal balance controller 110 may transmit the autobrake pedal correction factor 114 to autobrake pedal executive 115.

In various embodiments, aircraft braking system 100 may comprise an autobrake pedal executive 115. Autobrake pedal executive 115 may be in electronic communication with autobrake controller 105, pedal balance controller 110, and/or pedal executive 120. Autobrake pedal executive 115 may be configured to receive the initial autobrake pedal command 112 and/or the autobrake pedal correction factor 114. Autobrake pedal executive 115 may receive the initial autobrake pedal command 112 from autobrake controller 105. Autobrake pedal executive 115 may receive the autobrake pedal correction factor 114 from pedal balance controller 110. Autobrake pedal executive 115 may be configured to calculate one or more individual pedal braking commands. For example, autobrake pedal executive 115 may be configured to calculate an autobrake left pedal command 117 (associated with a left brake pedal and brakes) and/or an autobrake right pedal command 119 (associated with a left brake pedal and brakes). Each autobrake pedal command 117, 119 may be based on the initial autobrake pedal command 112 and/or the autobrake pedal correction factor 114. In that respect, each autobrake pedal command 117, 119 may comprise data indicating the braking force and/or pressure to apply to each corresponding brake. Autobrake pedal executive 115 may transmit each autobrake pedal command 117, 119 to pedal executive 120.

In various embodiments, aircraft braking system 100 may comprise a control mode executive 160. Control mode executive 160 may be in electronic communication with autobrake controller 105, pedal deceleration controller 170, and/or pedal executive 120. Control mode executive 160 may also be configured to receive inputs from various sources. For example, control mode executive 160 may be in logical and/or electronic communication with an autonomous pedal command 152, a pilot pedal input 154, an autonomous aircraft deceleration target 156, and/or a pilot aircraft deceleration target input 158. In that respect, control mode executive 160 may be configured as a central hub to receive and transmit braking signals such as deceleration signals (expressed in a deceleration rate) and/or force signals (expressed in a braking force, such as a pressure). Control mode executive 160 may allow for both manual inputs (e.g., via pilot pedal input 154 and/or pilot aircraft deceleration target input 158) and autonomous inputs (e.g., via autonomous pedal command 152 and/or autonomous aircraft deceleration target 156). In that regard, control mode executive 160 may be configured to allow manual deceleration input and/or braking control and autonomous deceleration input and/or braking control to aircraft braking system 100. Autonomous pedal command 152 and/or pilot pedal input 154 may be referred to as "pedal inputs," as both provide braking signals associated with a brake pedal.

In various embodiments, pilot pedal input 154 may be configured to allow manual input of braking signals. For example, pilot pedal input 154 may be located in the aircraft cockpit, and may comprise a physical brake pedal allowing a pilot and/or copilot to depress or deflect the pedals to input a braking signal (i.e., a pedal input). It should be understood that pilot pedal input 154 may provide a braking signal from one or more brake pedals (i.e., a left pedal brake provides left pedal inputs and a right pedal brake provides right pedal inputs). Based on the angle or displacement of the pedals, control mode executive 160 may calculate a corresponding braking force (e.g., a pressure or current) and/or deceleration rate for each corresponding pedal to transmit to pedal executive 120.

In various embodiments, autonomous pedal command 152 may be configured to allow automated and/or remote input of braking signals (i.e., pedal inputs). For example, autonomous pedal command 152 may be located onboard or external the aircraft and may comprise preprogrammed data comprising braking signals to transmit (e.g., during a preprogrammed flight, the aircraft, via autonomous pedal command 152, may be configured to brake at a predefined time, location, and/or the like). Autonomous pedal command 152 may also be configured to receive remote braking signals, such as, for example, during a remote control of the aircraft. It should be understood that the braking signal received from autonomous pedal command 152 may be an analogous braking signal received from a pilot pedal input 154, but without physical deflection of a brake pedal.

In various embodiments, control mode executive 160 may be configured to calculate a braking force command 124 based on input received from at least one of autonomous pedal command 152 and pilot pedal input 154. The braking force command 124 may comprise a single braking signal or multiple braking signals (e.g., the braking force command 124 may comprise a separate braking command for a right pedal and a left pedal, and/or the like). The braking force command 124 may comprise data indicating a braking force (e.g., a pressure) to apply to each gear and/or brake in braking assembly 60. Control mode executive 160 may transmit the braking force command 124 to pedal executive 120.

In various embodiments, control mode executive 160 may be configured to calculate a left gear deceleration command 162 and a right gear deceleration command 166 based on input received from at least one of autonomous pedal command 152 and pilot pedal input 154. Gear deceleration commands 162, 166 may comprise data indicating a desired deceleration rate to achieve for each gear in braking assembly 60. For example, the gear deceleration commands 162, 166 may comprise data indicating to decelerate the aircraft at a rate of about 1.0 m/s$^2$ (3.28 ft/s$^2$) to about 2.5 m/s$^2$ (8.2 ft/s$^2$), about 2.5 m/s$^2$ (8.2 ft/s$^2$) to about 3.5 m/s$^2$ (11.48 ft/s$^2$), about 3.5 m/s$^2$ (11.48 ft/s$^2$) to about 5.0 m/s$^2$ (16.4 ft/s$^2$), and/or any other suitable and/or desired deceleration rate (wherein about in this context refers only to +/−1.0 m/s$^2$ (3.28 ft/s$^2$)).

Control mode executive 160 may calculate left gear deceleration command 162 based on a left pedal input of pilot pedal input 154 (e.g., a deflection amount of a left brake pedal or a left pedal command from autonomous pedal command 152), and may calculate right gear deceleration command 166 based on a right pedal input of pilot pedal input 154 (e.g., a deflection amount of a right brake pedal or a right pedal command from autonomous pedal command 152). Left gear deceleration command 162 may indicate a desired deceleration rate for a left gear in braking assembly 60, and right gear deceleration command 166 may indicate a desired deceleration rate for a right gear in braking assembly 60.

In operation, for example, a pilot may wish to slow an aircraft, wherein the deceleration rates available from braking system 100 by deflecting the brake pedal(s) may be between about 1.0 m/s$^2$ (3.28 ft/s$^2$) and about 5.0 m/s$^2$ (16.4 ft/s$^2$), or between about 2.5 m/s$^2$ (8.2 ft/s$^2$) about 3.5 m/s$^2$ (11.48 ft/s$^2$), or any other suitable and/or desired deceleration rate (wherein "about" in this context refers only to +/−1.0 m/s$^2$ (3.28 ft/s$^2$)). In response to the right brake pedal being deflected, control mode executive 160 may calculate a right gear deceleration command 166 comprising a desired deceleration rate based on the deflection amount of the right brake pedal. In response to the left brake pedal being deflected, control mode executive 160 may calculate a left gear deceleration command 162 comprising a desired deceleration rate based on the deflection amount of the left brake pedal. Control mode executive 160 may transmit gear deceleration commands 162, 166 to pedal deceleration controller 170.

In various embodiments, pedal deceleration controller 170 may comprise one controller or multiple controllers (e.g., one controller for a left gear of braking assembly 60 and one controller for a right gear of braking assembly 60). Pedal deceleration controller 170 may be in electronic or logical communication with control mode executive 160 and/or pedal executive 120. Pedal deceleration controller 170 may also be in electronic communication with various inputs, sensors, and/or the like, as discussed further herein. Pedal deceleration controller 170 may be configured to calculate and/or transmit a gear pedal command (e.g., a left gear pedal command 172 and/or a right gear pedal command 174) to pedal executive 120. Pedal deceleration controller 170 may calculate left gear pedal command 172 in response to receiving left gear deceleration command 162, and pedal deceleration controller 170 may calculate right gear pedal command 174 in response to receiving right gear deceleration command 166. Pedal deceleration controller 170 may receive gear deceleration commands 162, 166 from any suitable source, such as, for example, from control mode executive 160.

In various embodiments, pedal deceleration controller 170 may also be configured to receive a gear deceleration feedback 164, 168. Gear deceleration feedback 164, 168 may comprise data indicating the measured deceleration rate of the aircraft (e.g., left gear deceleration feedback 164 may indicate the measured deceleration of a gear in the left side of braking assembly 60, and right gear deceleration feedback 168 may indicate the measured deceleration rate of a gear in the right side of braking assembly 60). Pedal deceleration controller 170 may receive gear deceleration feedback 164, 168 from any suitable source. For example, the deceleration of the aircraft may be calculated and/or measured by a wheel speed sensor, a gyroscope sensor, a global positioning system (GPS), and/or any other suitable input, sensor, and/or the like capable of calculating the deceleration of the aircraft.

Pedal deceleration controller 170 may calculate the gear pedal commands 172, 174 based on gear deceleration commands 162, 166 and/or the gear deceleration feedback 164, 168. For example, in response to left gear deceleration feedback 164 comprising data indicating that the aircraft has a measured deceleration rate of 1.0 m/s$^2$ (3.28 ft/s$^2$) and left gear deceleration command 162 comprising data indicating that the desired deceleration rate is 2.5 m/s$^2$ (8.2 ft/s$^2$), pedal deceleration controller 170 may calculate left gear pedal command 172 based on the difference between the measured and desired deceleration rates to comprise data indicating an adjusted deceleration rate (e.g., that an additional 1.5 m/s$^2$ (4.92 ft/s$^2$) of deceleration is needed). Pedal deceleration controller 170 may transmit gear pedal commands 172, 174 to pedal executive 120.

In various embodiments, pilot aircraft deceleration target input 158 may be configured to allow manual input of deceleration signals. For example, pilot aircraft deceleration target input 158 may be located in the aircraft cockpit, and/or in any other suitable location onboard the aircraft. A pilot, copilot, and/or any other suitable user may select a desired deceleration, such as, for example, "low", "medium", "max", "RTO", and/or the like. Each selected deceleration may correspond to a deceleration speed (e.g., "low" may correspond to 1.0 m/s$^2$ (3.28 ft/s$^2$), "medium" may correspond to 2.5 m/s$^2$ (8.2 ft/s$^2$), "max" may correspond to 3.5 m/s$^2$ (11.5 ft/s$^2$), "RTO" may correspond to 5.0 m/s$^2$ (16.4 ft/s$^2$), etc.). Pilot aircraft deceleration target input 158 may transmit the selected deceleration to control mode executive 160.

In various embodiments, autonomous aircraft deceleration target 156 may be configured to allow automated and/or remote input of deceleration signals. For example, autonomous aircraft deceleration target 156 may be located onboard or external the aircraft and may include preprogrammed data comprising deceleration signals to transmit (e.g., during an autonomous flight, the aircraft, via autonomous aircraft deceleration target 156, may be configured to decelerate at a predefined time, location, and/or the like). Autonomous aircraft deceleration target 156 may also be configured to receive remote deceleration signals, such as, for example, during a remote control of the aircraft, and transmit the remote deceleration signals to control mode executive 160. Control mode executive 160 may calculate aircraft deceleration target 104 based on autonomous aircraft deceleration target 156 and/or pilot aircraft deceleration target input 158.

In various embodiments, control mode executive 160 may also comprise a priority logic (e.g., force signal priority logic and/or deceleration signal priority logic). For example, in response to receiving input from both autonomous pedal command 152 and pilot pedal input 154 (e.g., receiving both manual and autonomous pedal input braking signals), control mode executive 160 may give priority to the manual input (e.g., pilot pedal input 154) and transmit the braking force command 124, and/or gear deceleration commands 162, 166, based on that braking signal. As a further example, in response to receiving input from both autonomous aircraft deceleration target 156 and pilot aircraft deceleration target input 158 (e.g., receiving both manual and autonomous deceleration signals), control mode executive 160 may give priority to the manual input (e.g., pilot aircraft deceleration target input 158) and transmit the aircraft deceleration target 104 based on that deceleration signal. In various embodiments, control mode executive 160 may provide priority based on any suitable and/or desired priority configuration.

In various embodiments, aircraft braking system 100 may comprise a pedal executive 120. Pedal executive 120 may be in electronic communication with autobrake pedal executive 115, control mode executive 160, and/or pedal deceleration controller 170. Pedal executive 120 may be configured to receive various braking commands. For example, pedal executive 120 may be configured to receive autobrake left pedal command 117, autobrake right pedal command 119, braking force command 124, left gear pedal command 172, and/or right gear pedal command 174. Pedal executive 120 may receive the autobrake left pedal command 117 and/or the autobrake right pedal command 119 from autobrake pedal executive 115. Pedal executive 120 may receive the braking force command 124 from control mode executive 160. Pedal executive 120 may receive left gear pedal command 172 and right gear pedal command 174 from pedal deceleration controller 170.

In various embodiments, pedal executive 120 may also be configured to generate a pedal braking command 122. The pedal braking command 122 may comprise data relating to a desired braking force (e.g., a pressure) to be applied in braking assembly 60. In that respect, the pedal braking command 122 may be based on at least one of braking force command 124, autobrake pedal commands 117, 119, and/or gear pedal commands 172, 174. Pedal executive 120 may receive braking force command 124, autobrake pedal commands 117, 119, and/or gear pedal commands 172, 174, analyze each command to determine the braking force to apply to each brake in braking assembly 60, and generate the pedal braking command 122 to comprise data indicating that corresponding braking force. For example, wherein braking assembly 60 comprises a hydraulic braking system, the pedal braking command 122 may comprise a fluid braking pressure (e.g., 200 psi (1379 kPa), 300 psi (2068 kPa), etc.). Therefore, pedal executive 120 may convert deceleration signals (e.g., gear pedal commands 172, 174 and/or auto-brake pedal commands 117, 119) into pressure values. Where braking assembly 60 comprises an electronic braking system, the pedal braking command 122 may comprise an electronic braking force. Pedal executive 120 may be configured to transmit the pedal braking command 122 to pedal braking controller 130. Pedal braking command 122 may comprise one or more commands (e.g., a left command for left gears/brakes of braking assembly 60, and a right command for right gears/brakes of braking assembly 60). Therefore, pedal executive 120 may convert deceleration signals (e.g., gear pedal commands 172, 174 and/or autobrake pedal commands 117, 119) into current values to be drawn by an electromechanical actuator.

In various embodiments, pedal executive 120 may also include a braking priority logic. For example, pedal executive 120 may give priority to received force signals (e.g., the braking force command 124) over received deceleration signals (e.g., the autobrake left pedal command 117 and/or the autobrake right pedal command 119). In that respect, in response to receiving both the braking force command 124 and the autobrake left pedal command 117 and/or the autobrake right pedal command 119, pedal executive 120 may generate the pedal braking command 122 to comprise data corresponding to the braking force command 124. In various embodiments, the braking priority logic of pedal executive 120 may give priority to received deceleration signals over received force signals.

In various embodiments, the braking priority logic of pedal executive 120 may prioritize different signal types (e.g., force signals vs. deceleration signals) depending on the speed at which an aircraft is traveling. For example, in response to an aircraft comprising braking system 100 traveling at a speed above a threshold speed, the braking priority logic may prioritize deceleration signals (e.g., gear pedal commands 172, 174) over force signals (e.g., braking force command 124). Therefore, at speeds above the threshold speed, in response to receiving pedal input braking signals from autonomous pedal command 152 and/or pilot pedal input 154, pedal executive 120 may calculate pedal braking command 122 based on gear pedal commands 172, 174 to achieve a desired deceleration rate. At low speed, such as speeds below the speed threshold, commands to slow the aircraft should be processed and executed rapidly. Because braking force command 124 may be processed more rapidly than deceleration signals (because deceleration signals must be converted into force values (e.g., pressures or current) by pedal executive 120), at speeds below the speed threshold, force signals may be prioritized. Therefore, in response to an aircraft comprising braking system 100 traveling at a speed below the threshold speed, in response to receiving pedal input braking signals from autonomous pedal command 152 and/or pilot pedal input 154, the braking priority logic may prioritize force signals over deceleration signals. Therefore, at speeds below the threshold speed, in response to receiving pedal input braking signals from autonomous pedal command 152 and/or pilot pedal input 154, pedal executive 120 may calculate pedal braking command 122 based on braking force command 124 to apply a braking force (e.g., pressure or current) to gears in braking assembly 60.

In various embodiments, the speed threshold may be any suitable speed such as 30 knots (56 kilometers per hour (kmh); 35 miles per hour (mph)), or 40 knots (74 kmh; 46 mph).

In various embodiments, aircraft braking system 100 may comprise a pedal braking controller 130. Pedal braking controller 130 may be in electronic communication with pedal executive 120 and/or braking assembly 60. Pedal braking controller 130 may comprise various components, subsystems, and/or the like. In that respect, and with reference to FIG. 3, pedal braking controller 130 may comprise a brake pedal command controller 52, an antiskid controller 54, and/or a brake control algorithm executive 56. In various embodiments, there may be more than one pedal braking controller 130. For example, there may be one pedal braking controller 130 for gears on the left side of braking assembly 60, and one pedal braking controller 130 for gears on the right side of braking assembly 60

Figure 3:
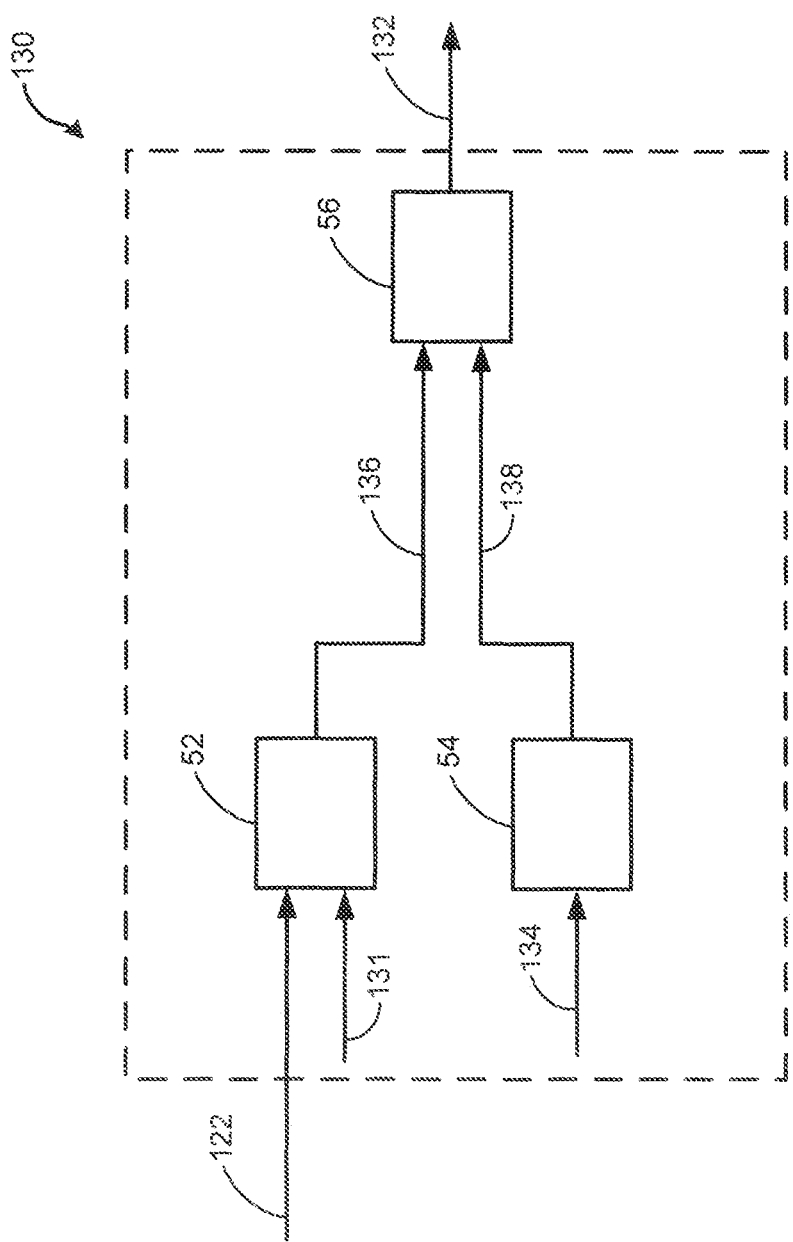
FIG. 3 illustrates a schematic view of a pedal braking controller for an aircraft braking system, in accordance with various embodiments.

In various embodiments, with combined reference to FIGS. 2 and 3, brake pedal command controller 52 may be in electronic and/or logical communication with brake control algorithm executive 56 and/or pedal executive 120. Brake pedal command controller 52 may also be in electronic communication with various inputs, sensors, and/or the like, as described further herein. Brake pedal command controller 52 may be configured to receive the pedal braking command 122 from pedal executive 120. Brake pedal command controller 52 may also receive a braking feedback 131. The braking feedback 131 may comprise data indicating the braking force (e.g., pressure or current) being applied by braking assembly 60. In various embodiments, the braking feedback 131 may comprise data indicating the braking force (e.g., pressure or current) being applied to each brake of aircraft 1. In further embodiments, the braking feedback 131 may comprise data indicating the braking force (e.g., pressure or current) being applied to multiple brakes of aircraft 1. Brake pedal command controller 52 may be configured to calculate a brake command 136. Brake pedal command controller 52 may calculate the brake command 136 based on the pedal braking command 122 and the braking feedback 131. For example, when the pedal braking command 122 comprises 1000 psi (6895 kPa), and the braking feedback 131 comprises 800 psi (5516 kPa), brake pedal command controller 52 may generate the brake command 136 to comprise an additional 200 psi (1379 kPa) (e.g., to increase the current braking pressure in the aircraft to match the desired braking pressure). Brake pedal command controller 52 may transmit the brake command 136 to brake control algorithm executive 56.

In various embodiments, antiskid controller 54 may be in electronic and/or logical communication with brake control algorithm executive 56. Antiskid controller 54 may also be in electronic communication with various inputs, sensors, and/or the like, as discussed further herein. For example, antiskid controller 54 may be configured to receive a wheel speed feedback 134. The wheel speed feedback 134 may be measured by a wheel sensor, and/or the like, and may comprise data indicating the current speed of each wheel in the aircraft. Antiskid controller 54 may analyze the wheel speed feedback 134 and calculate an antiskid command 138. The antiskid command 138 may comprise data indicating a maximum brake pressure and/or force that should be applied to each aircraft wheel. For example, in response to the wheel speed feedback 134 comprising data indicating that a wheel is locking up, antiskid controller 54 may calculate the antiskid command 138 to indicate that no additional braking force and/or pressure should be applied to that corresponding wheel, or that only a maximum of 500 psi (3447 kPa), and/or any other suitable calculated value, should be allowed to that corresponding wheel. Antiskid controller 54 may transmit the antiskid command 138 to brake control algorithm executive 56.

In various embodiments, with continued reference to FIGS. 2 and 3, brake control algorithm executive 56 may be in electronic and/or logical communication with brake pedal command controller 52 and/or antiskid controller 54. Brake control algorithm executive 56 may also be in electronic communication with braking assembly 60. Brake control algorithm executive 56 may be configured to receive the brake command 136. Brake control algorithm executive 56 may also be configured to receive the antiskid command 138 from antiskid controller 54. With combined reference to FIGS. 2 and 3, brake control algorithm executive 56 may be configured to calculate a final brake command 132. The final braking command may be based on the brake command 136 and the antiskid command 138. For example, in response to the brake command 136 having a braking pressure of 1200 psi (8274 kPa) and the antiskid command 138 comprising a maximum braking pressure of 800 psi (5516 kPa), brake control algorithm executive 56 may generate the final brake command 132 to comprise data indicating a braking pressure of 800 psi (5516 kPa). Brake control algorithm executive 56 may transmit the final brake command 132 to braking assembly 60. Braking assembly 60 may receive the final brake command 132 and may apply braking force and/or pressure to each corresponding aircraft wheel brake to achieve the force and/or pressure commanded by the final brake command 132.

Figure 4:
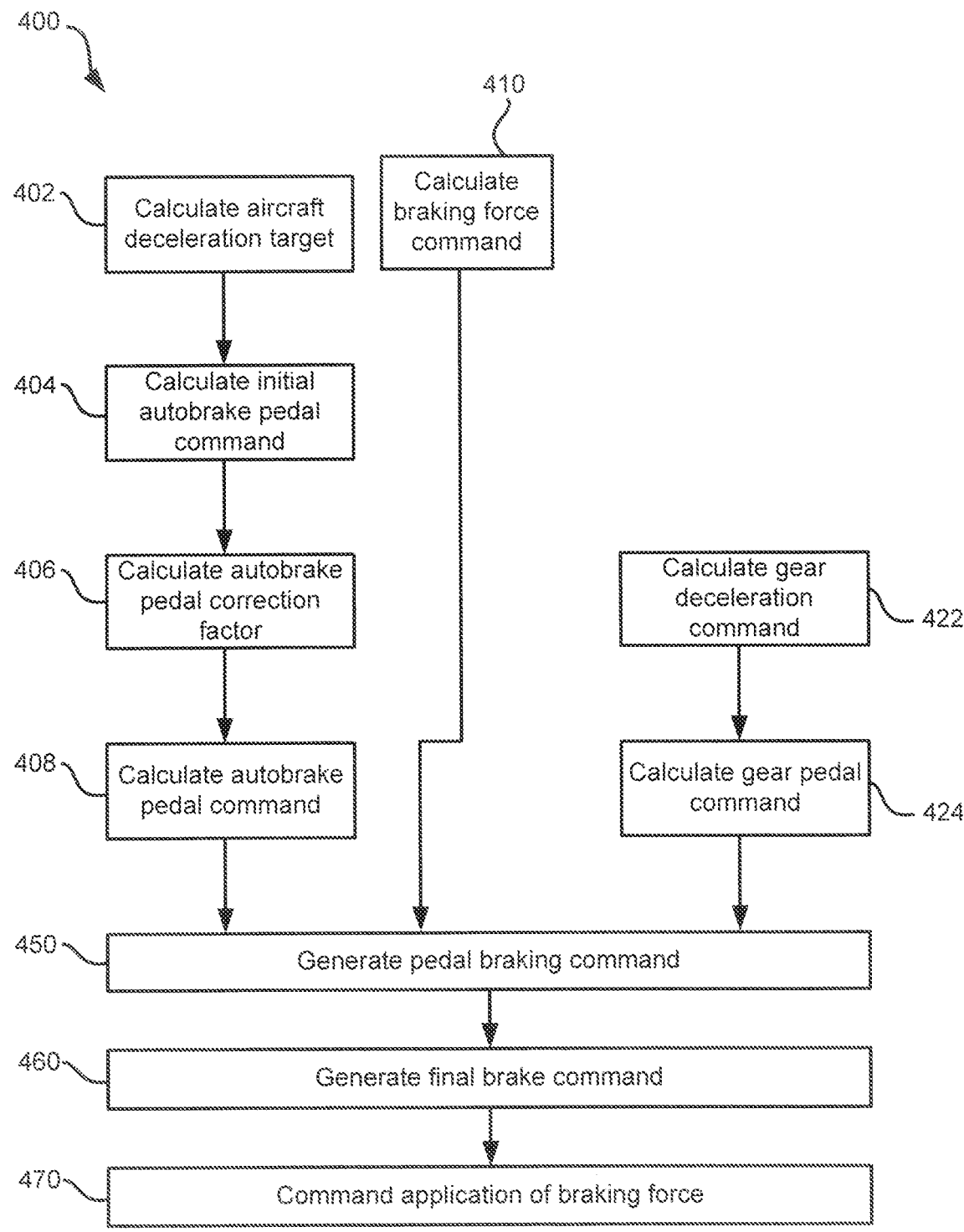
FIG. 4 illustrates a method of aircraft braking, in accordance with various embodiments.

In various embodiments, and with reference to FIG. 4, a method 400 of aircraft braking is illustrated. As previously discussed, and in various embodiments, method 400 may be configured to decelerate a manned and/or an autonomous aircraft during a landing phase, RTO event, and/or the like while also maintaining a steady course. In various embodiments, with combined reference to FIGS. 2 and 4, method 400 may comprise calculating an aircraft deceleration target 104 (Step 402). Control mode executive 160 may calculate aircraft deceleration target 104 based on an input received from autonomous aircraft deceleration target 156 and/or pilot aircraft deceleration target input 158. Control mode executive 160 may transmit aircraft deceleration target 104 to autobrake controller 105. In various embodiments, method 400 may comprise calculating an initial autobrake pedal command 112 (Step 404). Autobrake controller 105 may calculate the initial autobrake pedal command. The initial autobrake pedal command 112 may be based on aircraft deceleration target 104 and/or aircraft deceleration feedback 102. Autobrake controller 105 may transmit initial autobrake pedal command 112 to autobrake pedal executive 115.

In various embodiments, method 400 may comprise calculating an autobrake pedal correction factor 114 (Step 406). Pedal balance controller 110 may calculate autobrake pedal correction factor 114. Autobrake pedal correction factor 114 may be based on various environmental and/or operating factors, such as, for example, aircraft yaw angle 108, aircraft yaw speed 109, aircraft wheel speed, and/or other inputs 107. Pedal balance controller 110 may transmit autobrake pedal correction factor 114 to autobrake pedal executive 115.

In various embodiments, method 400 may comprise calculating an autobrake pedal command (Step 408) (e.g., autobrake pedal commands 117, 119). The autobrake pedal command may be calculated by autobrake pedal executive 115. For example, autobrake pedal executive 115 may calculate an autobrake left pedal command 117 and/or an autobrake right pedal command 119. Each autobrake pedal command 117, 119 may be based on autobrake pedal correction factor 114 and initial autobrake pedal command 112. Autobrake pedal executive 115 may transmit each autobrake pedal command 117, 119 to pedal executive 120.

In various embodiments, method 400 may comprise calculating a braking force command 124 (Step 410). Control mode executive 160 may calculate braking force command 124 based on a pedal input braking signal received by autonomous pedal command 152 and/or pilot pedal input 154. Control mode executive 160 may transmit braking force command 124 to pedal executive 120.

In various embodiments, with continued reference to FIGS. 2 and 4, method 400 may comprise calculating a gear deceleration command (Step 422). Control mode executive 160 may calculate a gear deceleration command (e.g., left gear deceleration command 162 and/or right gear deceleration command 166) based on a pedal input braking signal received from autonomous pedal command 152 and/or pilot pedal input 154. As discussed herein, a brake pedal in the aircraft may be deflected, and control mode executive 160 may receive a pilot pedal input 154 based on the amount of deflection (or an analogous pedal input braking signal may be received from autonomous pedal command 152). In response, control mode executive 160 may calculate the gear deceleration command based on pilot pedal input 154 and/or autonomous pedal command 152. The gear deceleration command may comprise data indicating a desired deceleration rate for the aircraft. A gear deceleration command may comprise a gear deceleration command for one or more gears in braking assembly 60 (e.g., left gear deceleration command 162 for at least one gear on the left side of braking assembly 60, and right gear deceleration command 166 for at least one gear on the right side of braking assembly 60).

In various embodiments, control mode executive 160 may transmit the gear deceleration command to pedal deceleration controller 170, which may receive the gear deceleration commands. Pedal deceleration controller 170 may also receive gear deceleration feedback (e.g., left gear deceleration feedback 164 and/or right gear deceleration feedback 168) as described herein. Pedal deceleration controller 170 may calculate a gear pedal command (Step 424) (e.g., left gear pedal command 172 and/or right gear pedal command 174) based on the gear deceleration command and/or gear deceleration feedback. For example, left gear pedal command 172 may be based on left gear deceleration command 162 and/or left gear deceleration feedback 164, and right gear pedal command 174 may be based on right gear deceleration command 166 and/or right gear deceleration feedback 168. For example, in response to left gear deceleration feedback 164 comprising data indicating that the aircraft is decelerating at 1.0 m/s$^2$ (3.28 ft/s$^2$) and left gear deceleration command 162 comprising data indicating that the desired deceleration rate is 2.5 m/s$^2$ (8.2 ft/s$^2$), pedal deceleration controller 170 may calculate left gear pedal command 172 based on the difference between the measured and desired deceleration rates to comprise data indicating that an additional 1.5 m/s$^2$ (4.92 ft/s$^2$) of deceleration is needed. Pedal deceleration controller 170 may transmit the gear pedal command to pedal executive 120, and pedal executive 120 may receive the gear pedal command. In response to the measured deceleration rate of the aircraft (reflected in gear deceleration feedback) and the desired deceleration rate (reflected in the gear deceleration command) differing, pedal deceleration controller 170 may adjust the gear pedal command transmitted to pedal executive 120 to correct such difference.

In various embodiments, method 400 may comprise generating a pedal braking command 122 (Step 450). Pedal executive 120 may be configured to generate pedal braking command 122. Pedal braking command 122 may be based on at least one of aircraft braking force command 124, the autobrake pedal commands, and/or gear pedal commands. Pedal executive 120 may receive the autobrake pedal commands (e.g., autobrake pedal commands 117, 119) from autobrake pedal executive 115. Pedal executive 120 may receive the braking force command 124 from control mode executive 160. Pedal executive 120 may receive the gear pedal commands (e.g., gear pedal commands 172, 174) from pedal deceleration controller 170.

Pedal executive 120 may include a braking priority logic. For example, the braking priority logic may dictate how to generate pedal braking command 122 in response to receiving the autobrake pedal commands, braking force command 124, and the gear pedal commands. For example, in response to receiving both the braking force command 124 and the autobrake pedal command, pedal executive 120 may generate pedal braking command 122 based on braking force command 124, because braking priority logic may prioritize manual braking signals to automated braking signals.

In various embodiments, the braking priority logic of pedal executive 120 may prioritize between braking force command 124 (a force signal) and the gear pedal command (a deceleration signal) (both received from pedal input braking signals) depending on whether the aircraft comprising braking system 100 is traveling at a speed above or below a speed threshold (which may be any suitable speed, as described herein). For example, in response to an aircraft comprising braking system 100 traveling at a speed above a threshold speed, the braking priority logic may prioritize deceleration signals (e.g., gear pedal commands 172, 174) over force signals (e.g., braking force command 124). Therefore, at speeds above the threshold speed, pedal executive 120 may calculate pedal braking command 122 based on gear pedal commands 172, 174 to achieve a desired deceleration rate. In response to an aircraft comprising braking system 100 traveling at a speed below the threshold speed, the braking priority logic may prioritize force signals over deceleration signals. Therefore, at speeds below the threshold speed, pedal executive 120 may calculate pedal braking command 122 based on braking force command 124 to apply a braking force (e.g., pressure or current) to gears in braking assembly 60. Pedal executive 120 may transmit the pedal braking command to pedal braking controller 130.

In various embodiments, method 400 may comprise generating a final brake command 132 (Step 460). Pedal braking controller 130 may be configured to generate final brake command 132. Pedal braking controller 130 may receive pedal braking command 122 from pedal executive 120. Final brake command 132 may be based on at least one of the pedal braking command 122 and/or a braking feedback 131. Pedal braking controller 130 may comprise an antiskid controller (e.g., antiskid controller 54 of FIG. 3) configured to calculate an antiskid command 138. Final brake command 132 may also be based on the antiskid command 138. Pedal braking controller 130 may transmit and/or execute final brake command 132 on braking assembly 60, commanding braking assembly 60 to apply a braking force to gears and/or brakes based on pedal braking command 122 and/or final braking command 132 (step 470). In that regard, pedal braking command 122 and/or final brake command 132 may cause braking assembly 60 to cause braking and/or deceleration in the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tangible, non-transitory memory configured to communicate with an aircraft braking system comprising a processor, the tangible, non-transitory memory having instructions stored thereon that, in response to execution by the processor, cause the aircraft barking system to perform operations comprising:
   receiving, by a control mode executive of the aircraft braking system, a pedal input from at least one of a brake pedal or an autonomous pedal command;
   calculating, by the control mode executive, a gear deceleration command comprising a desired deceleration rate based on the pedal input;
   calculating, by the control mode executive, a braking force command based on the pedal input;
   transmitting, by the processor, the gear deceleration command to a pedal deceleration controller of the aircraft braking system;
   calculating, by the pedal deceleration controller , a gear pedal command based on at least one of the gear deceleration command or a deceleration feedback, wherein the deceleration feedback comprises a measured deceleration rate, and the gear pedal command comprises a commanded deceleration rate; and
   generating, by a pedal executive of the aircraft braking system, a pedal braking command based on a priority logic,
   wherein the priority logic dictates that the pedal braking command is generated based on the gear pedal command from the pedal deceleration controller in response to an aircraft traveling at a high speed above a speed threshold, and
   wherein the priority logic further dictates that the pedal braking command is generated based on the braking force command from the control mode executive in response to the aircraft traveling at a low speed below the speed threshold.

2. The tangible, non-transitory memory of claim 1, wherein the operations further comprise calculating, by a pedal braking controller of the aircraft braking system, a final brake command, wherein the final brake command is based on at least one of the pedal braking command or a braking feedback.

3. The tangible, non-transitory memory of claim 1, wherein the operations further comprise commanding, by the processor, a braking assembly to apply a braking force to a gear in response to the generating the pedal braking command.

4. The tangible, non-transitory memory of claim 1, wherein the pedal input is associated with a deflection amount of the brake pedal.

* * * * *